(12) United States Patent
Goyal et al.

(10) Patent No.: US 6,466,985 B1
(45) Date of Patent: Oct. 15, 2002

(54) METHOD AND APPARATUS FOR PROVIDING QUALITY OF SERVICE USING THE INTERNET PROTOCOL

(75) Inventors: Pawan Goyal, Mountain View, CA (US); Gisli Hjalmtysson, Gillette, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/288,617

(22) Filed: Apr. 9, 1999

Related U.S. Application Data

(60) Provisional application No. 60/081,479, filed on Apr. 10, 1998.

(51) Int. Cl.[7] .............................................. G06F 13/00
(52) U.S. Cl. ....................... 709/238; 709/236; 709/246; 370/236
(58) Field of Search ................................. 709/230, 232, 709/234, 235, 236, 237, 238, 245, 246, 250, 311; 370/230, 231, 235, 236

(56) References Cited

U.S. PATENT DOCUMENTS

| | | | |
|---|---|---|---|
| 5,920,705 A | * | 7/1999 | Lyon et al. ................. 370/409 |
| 5,963,555 A | * | 10/1999 | Takase et al. ............... 370/395 |
| 6,084,855 A | * | 7/2000 | Soirinsuo et al. ........... 370/235 |

* cited by examiner

Primary Examiner—Viet D. Vu

(57) ABSTRACT

A method and apparatus for communicating information in a network is described. A packet for the information is generated at a first network device. The first network device assigns a flow label to the packet. The flow label indicates that the packet is part of a particular sequence of packets. The first network device also assigns a direction to the packet by, for example, setting a bit in the flow label. The packet is then sent to a second network device through at least one intermediate network device. This process is continued for the entire sequence of packets. The intermediate network device actually routes the packets to the second network device. The intermediate network device receives the packets at an input port. A flow label is identified for each packet. The intermediate network device determines whether a flow table has an entry for the flow label. If there is no present entry for the flow label in the flow table, an entry for the flow label is created. If there is an entry for the flow label, an output port associated with the flow label is obtained. The intermediate network device then sends the packet to the output port. This continues at each intermediate network device until each packet reaches the second network device.

15 Claims, 2 Drawing Sheets

METHOD AND APPARATUS FOR PROVIDING QUALITY OF SERVICE USING THE INTERNET PROTOCOL

CROSS-REFERENCE TO RELATED APPLICATION

This application claims the benefit of U.S. Provisional Application No. 60/081,479, filed Apr. 10, 1998, entitled "Provision of Quality Services Using the Internet Protocol," the entire disclosure of which is hereby incorporated by reference.

FIELD OF THE INVENTION

The embodiments of the invention relate to communications in general. In particular, the embodiments of the invention relate to a method and apparatus for providing quality of service using the Internet Protocol (IP).

BACKGROUND OF THE INVENTION

With the explosive growth of the Internet and new network applications almost exclusively written for the Internet Protocol (IP), it has become essential to optimize protocols and network management for the IP. Originally designed for data networking, the Internet is increasingly being used for audio and video applications. Whereas using a single network level technology may potentially simplify network management, providing sufficient service quality for multimedia applications over the Internet remains a significant challenge. After almost a decade of emphasis on resource reservations and end-to-end Quality of Service (QoS), as part of both the design of Asynchronous Transfer Mode (ATM) networks and standardization of the Resource Reservation Protocol (RSVP), there is now a significant backlash against these state rich, fine grained QoS models. This is in part based on the observation that rather than unavailability of bandwidth, service instability is causing problems to multimedia applications. Current efforts on differentiated services are an attempt to develop a service model that improves the service quality of the Internet while acting at aggregate levels. However ensuring stable service level requires richer traffic management facilities than currently available in the Internet.

The two most essential characteristics of the IP that have contributed to its success and distinguish it from connection oriented networks are the softness of state inside the network, and the aggregation properties of this state. Apart from the routing database, for best effort destination based routing, (cached) state is used purely for performance enhancement, but is not essential for correctly delivering packets to destination. In particular this state can be lost, or removed at routers discretion without affecting the validity of state elsewhere in the network. With single class destination based routing, prefix matching effectively aggregates the forwarding information for multiple destinations into a single entry per prefix. Even with nodal service differentiation (ToS bits) this property is retained.

In contrast, the strengths of the state rich telephony network, and derived connection-oriented models (e.g., ATM), are their service quality assurances. In part, the quality assurances are achieved through resource reservations and tight channel scheduling, based on declared or inferred user objectives. In part, the consistent quality is achieved through network management; exploiting intra-domain knowledge about network load and conditions. In addition connection oriented models enhance stability, as the time-scale of (load) change becomes that of connection duration, rather than that of routing updates and packet interarrivals. Whereas traditional methods exploit mechanisms for connectivity and reservations to achieve quality of service and implement traffic management, the coupling of these distinct mechanisms has contributed to the perceived complexity of connection oriented networks.

In view of the foregoing, it can be appreciated that a substantial need exists for introducing the QoS advantages of connection-oriented networks into connectionless networks (e.g., using IP) without losing the advantages given by connectionless networks.

SUMMARY OF THE INVENTION

One embodiment of the invention comprises a method and apparatus for communicating information in a network. A packet for the information is generated at a first network device such as an end system. The first network device assigns a flow label to the packet. The flow label indicates that the packet is part of a particular sequence of packets. The first network device also assigns a direction to the packet by, for example, setting a bit in the flow label. The packet is then sent to a second network device (e.g., another end system) through at least one intermediate network device (e.g., a router or switch). This process is continued for the entire sequence of packets for a given flow.

The intermediate network device actually routes the packets to the second network device. The intermediate network device receives the packets at an input port. A flow label is identified for each packet. The intermediate network device determines whether a flow table has an entry for the flow label. If there is no present entry for the flow label in the flow table, an entry for the flow label is created. If there is an entry for the flow label, an output port associated with the flow label is obtained. The intermediate network device then sends the packet to the output port. This continues at each intermediate network device until each packet of a given flow reaches the second network device.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
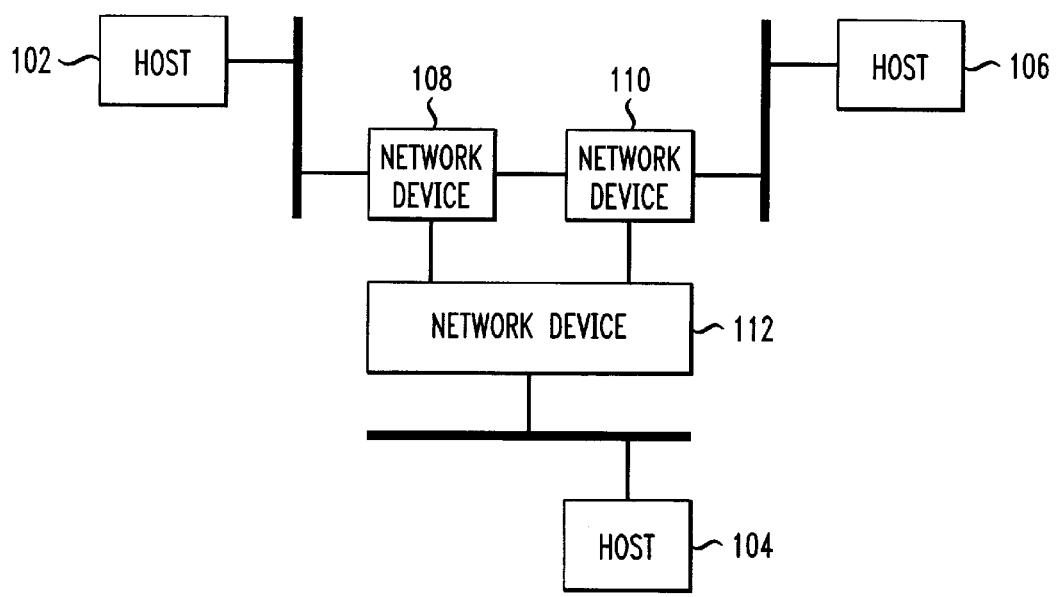
FIG. 1 is a block diagram of a network suitable for practicing one embodiment of the invention.

The embodiments of the invention are directed to enhancing the consistency in service quality on the Internet. Whereas the soft-state and scalability have been key to the success of the Internet, its service quality is wanting. The embodiments borrow some of the concepts from connection-oriented networks, without compromising on the essential characteristics of IP. The embodiments are optimized for carrying IP "flows," and may be implemented as part of lower level (layer 2) protocols, including ATM or Multiprotocol Label Switching (MPLS). One particular advantageous embodiment of the invention creates the capability of running the IP directly on top of the optical layer of a network.

The embodiments of the invention provide QoS capability using the IP, particularly as set forth in Request For Comments (RFC) 1883 titled "Internet Protocol, Version 6 (IPv6) Specification," dated December 1995 ("IPv6"), which is incorporated by reference herein. By introducing QoS characteristics using the IP, the need for carrying IP datagrams in lower layer protocol units A ATM cells) is avoided. This reduces network complexity by removing a network layer, which in turn simplifies network and service management. Furthermore, using IP also avoids the complexity of mapping customer requests (at the network interface) onto requests on the physical backbone infrastructure that may have conflicting service models.

The embodiments of the invention explicitly identify a group of IP packets as belonging to a "flow," and ensures that packets of a flow traverse the same sequence of routers. This creates some unique advantages, such as load balancing, enhanced management and accountability, the ability to assign attributes to a flow, amortizing costly (in terms of bandwidth) operations over a sequence of packets, and providing symmetric and reverse path routing.

A first advantage is load balancing. In current IP, all the packets from a source intended for a given destination traverse the same path. This technique does not optimally utilize the network resources. Furthermore, if a link on the path gets overloaded, a router may reroute either all or part of the traffic to a given destination. This leads to either routing instability or route fluttering, neither of which is desirable for a large class of applications. This can be overcome using "route pinning." Route pinning involves ensuring that packets for a particular flow traverse the same sequence of intermediate network devices (e.g., routers). Route pinning enables the network to better utilize its resources and avoid the route-flapping problem while ameliorating routing instability.

A second advantage is that the embodiments of the invention enhance management and accountability within the network. Recording of network usage, whether for billing or off-line diagnostic analysis, is an important part of providing network services. This is particularly important in a network that provides some assurance regarding quality. Labeled flows traversing a fixed path enable this functionality.

A third advantage is that certain attributes, such as QoS attributes, can be assigned to designated flows. For a number of reasons, it may be desirable to assign attributes to distinguished flows, for example to reserve resources along the path. This requires a mechanism to declare a path as "special" and then to describe (and possibly negotiate) the path attributes. RSVP is designed for this purpose. The use of RSVP with the current IP (e.g., IPv4), however, is particularly complex without some mechanism to declare a path as "special." This problem is overcome somewhat using the flow label already defined for IPv6.

A fourth advantage is that costly operations in terms of bandwidth can be amortized over a sequence of packets. Assignment of flow attributes (for example, reservations), requires some mechanism to establish state and share that state across sequence of datagrams. State sharing fails if the forwarding path is not stable across multiple packets. Installing state is expensive, both in latency (end-to-end consistency) and in processing (admission control, and negotiations). Thus, it is desirable that forwarding path of a flow be stable. Stable forwarding paths also enable other optimizations. For example, though explicit routes can be specified in every IPv6 packet, significant bandwidth savings can be accrued when stability of a flow path can be assumed, as with using, for example, the concept of route pinning. The same concept applies more generally to extension headers.

In addition, the embodiments of the invention offer the advantage of symmetric and reverse path routing. Symmetric routing is desirable because it simplifies algorithms and provides benefits to some services. Reverse path routing is necessary for flow level control where it must be possible to send control messages on the reverse forwarding path. Part of the complexity of RSVP is due to mechanisms to provide a control path on the reverse data path. Explicit labeling of flows will enable routing symmetry.

The embodiments of the invention provide the fundamental strengths of connections while retaining the softness of state and aggregation properties of connectionless networks. The embodiments of the invention makes use of flows that can be designated as "special" or "distinguished" through the use of a unique identifier or label for each flow. A distinguished flow can then be pinned to a route, support reverse path routing, and may have associated (QoS) attributes.

A new flow can be established by using a previously undeclared flow name. Assignment of a name declares the intent to use this flow for something special, and enables the end-system to refer to the flow for later attribute assignment. An unknown flow name is interpreted as a request for a new flow.

In addition to the flow name, the first packet of a flow (effectively the flow-request) contains a datagram of a network level protocol for which the network node can do routing (e.g., IPv6). Although subsequent packets may contain arbitrary datagrams, softness of state is achieved when all the transferred packets are of such "known" protocol. In that case, if the state is lost, the next packet of the named flow is processed as if it were the first packet of a new flow. To optimize the transport network for IPv6, the network nodes simply support IPv6 routing. The flows defined herein incur no call setup delay. Moreover, adopting (or assuming) a "use it or loose it" state invalidation policy, there is no need for explicit tear-down. A flow may be uni- or bidirectional.

There are four aspects of constructing a flow: (1) declaring a name; (2) pinning the route, (3) enabling reverse path routing, and (4) assigning attributes (such as QoS). Abstractly, current network nodes maintain two tables, a routing table and a forwarding table. In the case of a traditional router the forwarding table corresponds to the routing cache. On an ATM switch or an MPLS Label Switch Router (LSR), the forwarding table is respectively the Virtual Channel (VC) lookup table or the label lookup table. To support the flows used in the embodiments of the invention, a traditional router would be augmented with an additional forwarding table for mapping flow names to flow state (including the output port), as discussed in more detail with reference to FIG. 2.

A flow request may be interpreted as an implicit request for route pinning. If not, route pinning may be requested subsequently in a separate message. Without route pinning, the entry in the flow cache simply points to the corresponding entry (in the regular cache) for the destination address. When route pinning is requested this entry is copied and thus becomes independent of changes in the default destination based route.

Reverse path routing on a flow requires the node to record the incoming port as a part of the flow forwarding state. In addition this information must be conveyed to the output port. This given, however, reverse path routing may be achieved either by constructing a new path in the reverse direction (ie., a path association) or by a naming convention allowing a name to be resolved in the reverse path name space.

Other flow attributes are signaled separately, and can be processed with specialized software using a conventional processor, or by a dedicated attribute control processor. Flows maintain a control mapping separate from the forwarding map, thus supporting control paradigms allowing service specific controllers, potentially installed on demand, to process the attribute messages.

To aggregate state, a node (e.g., a backbone border node) may aggregate smaller flows and tunnel the aggregate flow to a particular node in the network (an egress router for example). After exiting the tunnel, the data packets would then be routed to their respective destinations as if they had originated at the tunnel end. To construct the tunnel, the router precedes the user packets with a "tunnel request" packet, a datagram of the "known" protocol, distinguished as a tunnel request. In the case of the IP as the known protocol, explicit routing could be specified using the source routing option (extension header for IPv6). Of course this is complementary to the use of normal tunneling, which themselves might exploit flows as well.

The IPv6 flow label can be used to implement a flow in an IPv6 network. To define a name an end-system sets a locally unique flow label on a packet intended for that flow. Hop-by-hop extension headers are used to assign attributes to the route. For example, the hop-by-hop router alert extension can be used, although additional extension headers are possible as well.

For network centric flows in IPv6, a router may identify a sequence of packets whose flow label is not set and aggregate them into a tunneled flow. The tunnel request packet is an IPv6 datagram carrying the assigned flow label. The router then sets the flow label of subsequent packets, which are then nullified on exit from the tunnel. To aggregate labeled flows we use traditional IP tunneling with flows.

The embodiments of the invention modify the current definition of the IPv6 flow label for reverse path forwarding. The first bit of the flow label specifies whether it is source or destination unique, with a zero (0) implying a destination unique flow label, and a one (1) declaring a source unique flow label. To send on the reverse path, the receiver flips the first bit of the flow label. Since the source and destination are also swapped (as compared to the received packet), the same address is used with the flow label to uniquely identify the flow.

Implementing the flow concept in MPLS is similar to that for IPv6. A sender uses a label to define a flow name. As labels are "link local" this amounts to upstream label allocation. Flow pinning is implemented as with IPv6. Attributes are signaled using hop-by-hop router alerts. Reverse path is accomplished in a manner similar to IPv6, that is, dividing the namespace on each link into two, with a direction distinguished by the leading bit. It is also possible, however, to use a separate flow name to associate the reverse path to the corresponding label path. Furthermore, this flow association might be maintained only at the higher level, and not be explicit at the label path level. This could for example be the case if running IPv6 over MPLS.

The embodiments of the invention aggregate separate flows to a tunnel in MPLS by using a label stack. A label is pushed on the stack at the entry of the tunnel, and popped off on exit. As the tunnel end may in effect be a multiplexing point (i.e., a virtual termination of many tunnels) the tunnel label must be assigned by the tunnel termination node (downstream allocation), to ensure that the enclosed labels further down on the stack are uniquely resolved. To avoid subsequent round trip delays, however, the first request may yield two labels, allowing the entry point node to maintain a cache one label for subsequent tunnel construction.

Referring now in detail to the drawings wherein like parts are designated by like reference numerals throughout, there is illustrated in FIG. 1 a network suitable for practicing one embodiment of the invention. FIG. 1 illustrates an exemplary network 100 having multiple hosts and multiple intermediate network devices connected as shown. Network 100 shown in FIG. 1 represents one possible network configuration and will be used to describe the operation of the invention. Specifically, three intermediate network devices 108, 110 and 112 are coupled to one another as shown. FIG. 1 also illustrates three host devices 102, 104 and 106. Each host is coupled to a particular intermediate network device using an interface 120 (not shown). Interface 120 may be any type of interface circuit, including a network, capable of coupling one or more hosts to an intermediate network device. Alternatively, interface 120 may be omitted, and the host (or hosts) coupled directly to the intermediate network device. To simplify the illustration, only one host device is shown coupled to each intermediate network device. Those skilled in the art will appreciate that multiple hosts may be coupled to a single intermediate network device and a single host may be coupled to multiple intermediate network devices.

It can be appreciated that the particular configuration shown in FIG. 1 is chosen as an example only and is not limitive of the type of network on which the present invention can work. The number of configurations that networks can take are virtually limitless and techniques for setting up these configurations are well known to those skilled in the art. The embodiments of the present invention can operate on any of these possible configurations.

Furthermore, both the host device and intermediate network device can represent several types of devices. An example of a host device would be an end system (ES). An ES is a device attached to a network or subnetwork that is used to support end-user applications or services (e.g., a personal computer). An example of an intermediate network device would be a router, ATM switch or LSR. In this embodiment of the invention, a router is used as an example to demonstrate the principles described herein. Furthermore, the router utilizes IPv6 to route individual packets between hosts or end systems.

Figure 2:
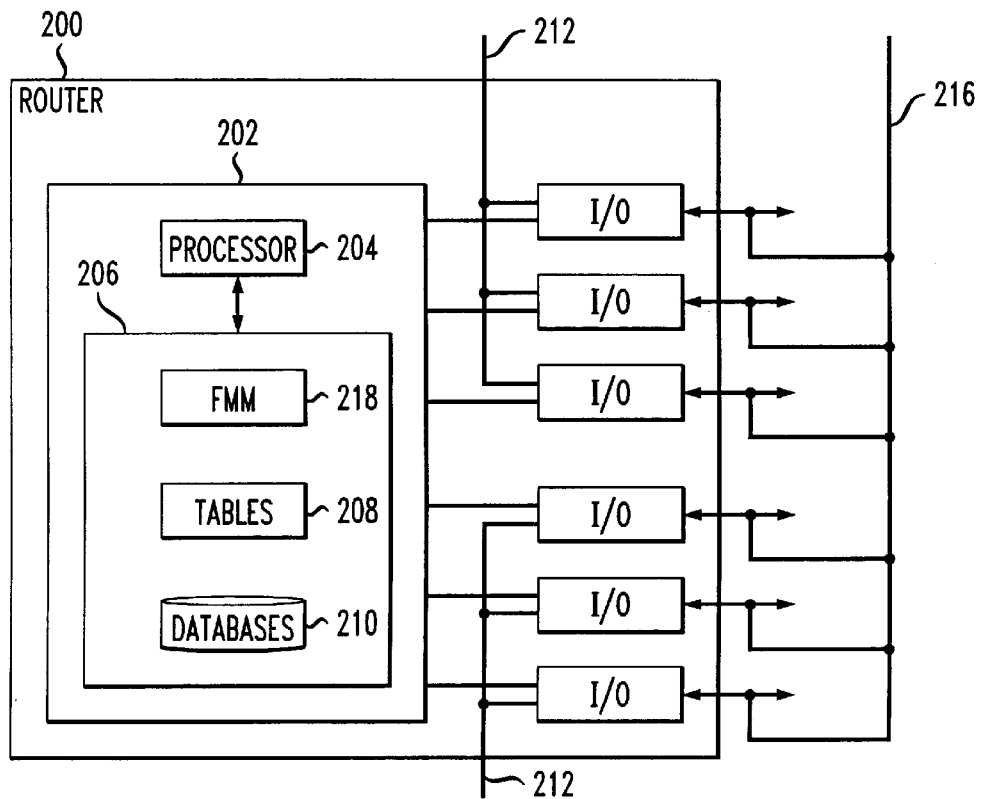
FIG. 2 is a block diagram of a router suitable for practicing one embodiment of the invention.

FIG. 2 is a block schematic diagram of a router suitable for practicing one embodiment of the invention. A router 200 is capable of incorporating the teachings of the present invention and includes a routing engine 202 having a processor 204 and a storage device 206. Storage device 206 may be any suitable computer readable memory device, such as one or more dynamic random access memory (DRAM) devices, disk drives, or other mechanism for storing data.

Routing engine 202 includes in storage device 206 various computer program segments that when executed by a processor (e.g., processor 204) performs the functionality for the various embodiments of the invention. In one embodiment of the invention, the computer program segments are combined into a single flow management module (FMM) 218. It can be appreciated, however, that the functions performed by this module can be separated into more modules, or be distributed throughout the system, and still fall within the scope of the invention. Furthermore, although this embodiment of the invention implements the functionality of this module in software, it can be appreciated that the functionality of this module may be implemented in hardware, software, or a combination of hardware and software, using well-known signal processing techniques.

Routing engine 202 includes also includes various tables 208 and databases 210 contained within storage device 206. Tables 208 and databases 210 maintain information necessary for router 200 to properly forward data. Tables 208 may include a Routing Table and a Flow Table. Databases 210 may include a Link State Database and a Forwarding Database. Routing engine 202 is capable of calculating paths through a network based on information contained in tables 208 and databases 210, as well as the functionality provided by FMM 218.

Input/Output (I/O) interfaces 212 are coupled to routing engine 202 and provide a physical connection to one or more network links 216. I/O interfaces 212 may be any suitable means for controlling communication signals between objects using a desired set of protocols, services and operating procedures, such as IPv6. In this embodiment of the invention, I/O interfaces 212 are bidirectional, that is, signals can be sent and received using any particular I/O interface. Those skilled in the art, however, will recognize that uni-direction interfaces can also be used and fall within the scope of the invention. Furthermore, those skilled in the art will understand that the communication signals may be received over any suitable medium such as twisted-pair wire, co-axial cable, fiber optics, radio-frequencies, and so forth.

Processor 204 may be any general purpose microprocessor having sufficient speed to implement the functionality described herein, such as the Pentium®, Pentium Pro, or Pentium II processors made by Intel Corporation.

It can be appreciated that although router 200 is used as an example to describe this embodiment of the invention, those skilled in the art will appreciate that various types of routers and other intermediary network devices may be used with the invention described herein.

Figure 3:
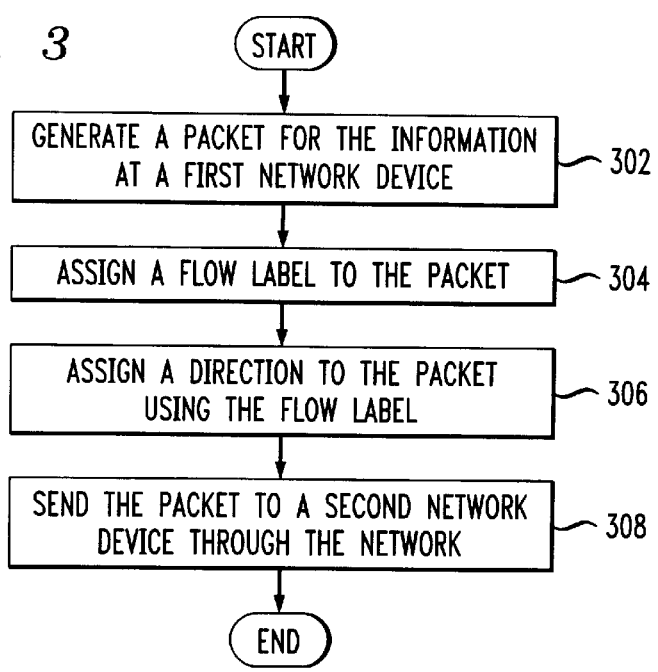
FIG. 3 is a block flow diagram of the steps performed by a first network device in accordance with one embodiment of the invention.

FIG. 3 is a block flow diagram of the steps performed by a first network device in accordance with one embodiment of the invention. As shown in FIG. 3, a packet for the information is generated at a first network device at step 302. A flow label is assigned to the packet at step 304. A direction is assigned to the packet using the flow label at step 306. The packet is sent to a second network device through the network at step 308.

With respect to step 306, an example of assigning a direction includes a flow label having a plurality of bits. The first network device would indicate the direction for the packet by modifying the flow label. The first bit of the flow label specifies whether it is source or destination unique, with a zero (0) implying a destination unique flow label, and a one (1) declaring a source unique flow label. To send on the reverse path, the receiving network device flips the first bit of the flow label. Since the source and destination are also swapped (as compared to the received packet), the same address is used with the flow label to uniquely identify the flow.

Figure 4:
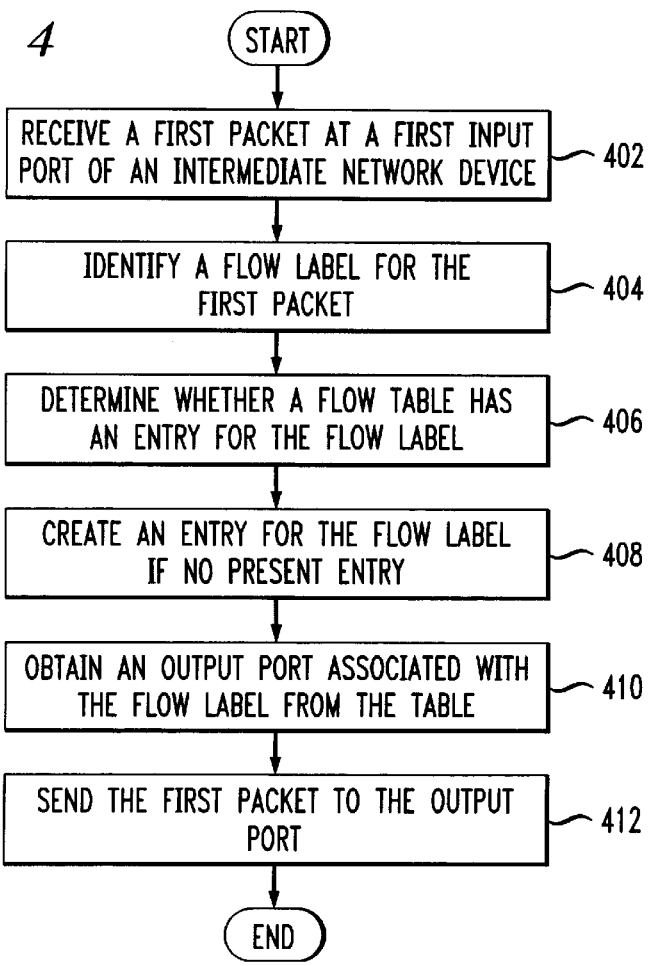
FIG. 4 is a block flow diagram of the steps performed by an intermediate network device in accordance with one embodiment of the invention.

FIG. 4 is a block flow diagram of the steps performed by an intermediate network device in accordance with one embodiment of the invention. As shown in FIG. 4, a first packet is received at a first input port of an intermediate network device at step 402. A flow label for the first packet is identified at step 404. Whether a flow table has an entry for the flow label is determined at step 406. An entry for the flow label is created if no present entry at step 408. An output port associated with the flow label is obtained from the table at step 410. The first packet is sent to the output port at step 412.

An entry for the flow label is added to the flow table if there is no present entry at step 408. Whether the flow label has an associated routing attribute is determined. A pointer associated with the flow label is stored in the flow table, the pointer pointing to an output port in a routing table for the intermediate network device, if the flow label does not have a routing attribute associated with it. An output port from the routing table is stored in the flow table associated with the flow label, if the flow label does have a routing attribute associated with it.

The steps described with reference to FIG. 4 may be better understood using the following example. In this embodiment of the invention, the intermediate network device is router 200. Router 200 receives a first packet at a first input port. FMM 218 of router 200 identifies a flow label for the first packet. FMM 218 searches a flow table stored with tables 208 to determine whether the flow table has an entry for the flow label. FMM 218 creates an entry for the flow label if no entry is currently in the flow table for the flow label. FMM 218 then obtains an output port associated with the flow label from the table. Routing engine 202 sends the first packet to the output port.

Router 200 performs the above steps with each packet that it receives. Packets received subsequent to the first packet and having the same flow label would be processed more efficiently since an entry for the flow label will already be present. If a packet does not have a flow label, FMM 218 can be programmed to ignore the packet in terms of processing it for flow control, or to assign a flow label if needed for more efficient routing (e.g., such as for tunneling).

If there is no entry for the flow label present in the flow table, FMM 218 creates an entry. FMM 218 determines whether any attributes have been assigned to the flow label, such as route pinning. If a route pinning attribute has not been assigned to the flow label, a pointer associated with the flow label is stored in the flow table. The pointer points to an output port in the routing table for router 200. If a route pinning attribute has been assigned to the flow label, by FMM 218 or the first network device, FMM 218 copies the output port stored in the routing table having the same destination as the first packet in the flow table. The output port is associated with the flow label. In this manner, subsequent packets sharing the same flow label will traverse the path designated by the routing table if route pinning is not set, or will traverse the same path as the first packet if route pinning is set. In the latter case, a stable forwarding path is maintained since each packet within a flow will traverse the same sequence of routers.

To enable reverse path forwarding, the first input port where the first packet was received must also be stored in the flow table in association with the flow label for the first packet. If router 200 receives a second packet, FMM 218 identifies a flow label for the second packet. Further, FMM 218 also determines a direction for the second packet by examining the first bit of the flow label. If the first bit of the flow label indicates that the second packet is from the second network device back to the first network device, then routing engine 202 sends the packet to the I/O interface port where the first packet was initially received. This can be accomplished since I/O interfaces 212 are bidirectional. Those skilled in the art could appreciate that reverse path routing could also be implemented using unidirectional ports if necessary.

The embodiments of the invention can also apply the aggregation properties already currently used in IPv4 and IPv6 for individual packets to the concept of flows. For example, if router 200 receives a second packet at an input port, it first identifies its flow label. Then it determines whether the first packet and the second packet should be aggregated based on their flow labels and either associated attributes or intelligence of routing engine 202. If the first and second packets should be aggregated, they are aggregated using conventional tunneling techniques.

The use of flows in MPLS is similar to IPv6, with specific modifications to take advantage of the underlying mechanisms for MPLS. This embodiment of the invention assumes a "neighbor discover protocol" that can (be augmented to) carry capability information such as label space. It also assumes that the network can do routing on demand inside the label network (this is virtually implied by on demand routes).

There are two types of allocations in this embodiment of the invention. The first is upstream allocated on-demand label paths of three sub-types: (1) without any acknowledgments (acks); (2) with hop-by-hop ack's; and for tunnels. The second general allocation type is downstream allocated on-demand label paths. These are allocated using, for example, the methods and apparatus set forth in U.S. patent application Ser. No. 09/015,496, filed on Jan. 29, 1998, entitled "An Architecture For Lightweight Signaling In ATM Networks", the entire disclosure of which is hereby incorporated by reference. One of the down sides of downstream allocation as compared to upstream allocation is that with tunnels the hop-by-hop latency (over the tunnel) may be 0 (end-to-end) latency. One solution could be to place an IPv4 header into a single ATM cell.

In both the upstream allocation and downstream allocation, the label path setup can be accomplished in the following steps: (1) the end system initiates path setup; (2) the path (channel, featherweight flow); (3) can subsequently assign additional parameters to the flow. One solution is to use a higher level protocol for routing and forwarding of non-switched packets As part of boot strapping nodes exchange capabilities and setup a default path that is subsequently used for out of band signaling. If a node understands multiple higher level protocols (i.e., can route using the rules of many protocols) e.g., IPv4, IPv6, ATM UNI, a different signaling path can be established for each of these protocols.

The label distribution protocol uses a short label, which is valid for a limited time and created on demand. This provides manageability, as the forwarding map can be customized based on network conditions, the need of the flow, and so forth. Softness of state is maintained for those protocol types for which a default path (and/or a signaling channel) is defined, and whose protocol data units carry enough information to establish (recover) the forwarding state. This follows as the default paths per protocol assume that the LSR per protocol processing is sufficient to reach inside the MPLS encapsulation and parse the (header) information needed to (re)create the state. As a consequence, no explicit signaling is needed. The soft state is relatively efficient, as it is "use it or loose it," thus averting the need for keep-alive messages to maintain the state.

As part of neighborhood discovery each node informs its upstream neighbor of the label space it is willing to accept. It is assumed that by standardization some small number of labels may be taken for granted (say 1 or 10). The upstream node may subsequently ask for the namespace to be expanded (this is done on signaling connections from controller, to controller).

Labels are assigned for one-way connections by default. New extensions allow for bidirectional label assignment. This can be done either by mechanisms to make a label valid both ways, or alternatively by associating a new label path going on a reverse route with a particular existing forward path.

To create a new label path from a source (S) to a destination (D), S creates a datagram (or otherwise the protocol transfer unit of the protocol used on the default (signaling) path), allocates a new label and issues a path-request communicating a path request, the new label and the datagram.

The path request could be a new router alert option (an extension header in IPv6), or could be communicated implicitly either on a signaling channel, or by interpreting a new (unknown) label as a path request. The last one offers particular advantages and is described in more detail below.

With respect to the new label, potentially more than a single label will be pushed on the stack, for example when constructing a tunnel. The new label(s) may be pushed on top of already existing labels.

The datagram may encode information about routes (e.g., explicit routes), type of service, or desired service quality as the richness of the protocol on the default path allows.

An intermediate node receiving a path-request processes the message as follows. First, a new label entry is created in its forwarding table(s) unique on the pair (input port, label). This could be achieved by having a separate forwarding table per input port. Note that input port here may be an abstract input port, e., an end of a tunnel. The forwarding function on the enclosed datagram is then performed, yielding an output port determination. A new label is allocated on the outgoing port. The label forwarding table is then updated, recording the outgoing port and outgoing label. The request is then forwarded to the appropriate output port. If an acknowledgment is requested, then the intermediate node replies with an ack. If ack's are requested, the information could be a semi-static and negotiated as part of neighbor discovery. This could also, however, be done on demand by having the datagrams carry path construction attribute objects.

If a bidirectional path is requested then instead of replying with an just an ack, a label is allocated a label on the reverse path, the forwarding table is updated, the reverse label is recorded, and an ack is sent using the new upstream label.

Some of the possible errors include "Reject—sent on a well-known (signaling) channel." This would also include a reason code.

To implement flows with a soft state, label paths can be created for arbitrary data streams. For example, an access node from a frame-relay network to a LSR network capable of routing IP datagrams only, would simply create a label path by creating and sending an IP datagram as a path request, and encapsulating the frame-relay packets. When new (unknown) labels are interpreted as label requests, however, the state constituting labels paths used by well know protocols (i.e., one for which the LSR cloud can do routing) becomes soft. This happens because the state may be locally managed, and in particular lost, as the next datagram arriving with a label that is no longer recognized will serve as a path request and effectively reconstruct the state. In this case there is no call setup delay. Moreover, by adopting (or assuming) a "use it or loose it" state invalidation policy, there is no need for explicit tear-down.

RSVP is designed to support reservations for individual end-to-end flows on the Internet, in particular IPv4. An RSVP session is identified by a destination address and transport level protocol, and optionally the destination ("generalized") port. A session is further classified into flows by receiver specified filters. Whereas in principle these filters may be applied to any fields in the IP- or protocol level header (even potentially application level headers), current specifications and implementations of RSVP limit filters to a source address, and optionally the source port. Reservations are on simplex streams and are exclusively receiver initiated.

A destination address may be a multicast address, with the multicast session having multiple senders and receivers (multipoint-to-multipoint). Receiver initiated reservations may result in different reservations in different segments of the distribution of the multicast (variegated multicast trees). Moreover, in multicast sessions with multiple senders, receivers may use the three different reservation "styles" (one of wild-card, fixed, or shared exclusive) to make reservations at even a finer level of the flow than specified by the filters.

The two principal messages of QoS management in RSVP are the path message, sent from senders towards receivers, and the reservation messages, sent from receivers towards senders. Path messages establish flow identification state along the downstream path. This state includes filters and the traffic description (T-spec). Messages are processes at each hop before forwarding. Reservations messages carry reservation requests (R-specs), and styles. Significant complexity is incorporated into RSVP to ensure that the RSVP signaling messages are forwarded to the same path (forward and reverse) as data is being forwarded. To make the RSVP state "soft" and to cope with route changes and changes in the topology of multicase distribution trees, path state and reservation state must be refreshed periodically.

Implementing RSVP using this embodiment of the invention simplifies RSVP in several ways. First, this embodiment of the invention already does a flow classification, thus subsuming most of the filtering mechanisms of RSVP. In addition to the benefit of separation of mechanisms, using this embodiment of the invention allows for rich filtering at the edge of the network (to classify the incoming datastream into flows), but very simple flow identification (explicit, or very trivial) inside the network. Filtering of finer grained subflows and RSVP reservation styles that apply on subflows (fixed, or shared exclusive) could be implemented by performing a nodal classification, or by defining a new flow for each of the subflows. This embodiment of the invention supports variegated trees similar to that of RSVP.

RSVP messages are effectively signaled in-band on the established flow, distinguished with router alert option (hop-by-hop extension header). Whereas this could be the standard router alert options, the new "CC" extension header could also be used, further improving efficiency by allowing the RSVP messages to be forwarded on the output ports before nodal processing takes place. The latter is a departure from current RSVP semantics. Using this embodiment of the invention, the RSVP path message serves to advertise the T-spec, and possibly a filter for subflow classification. The previous hop information is not needed. As the message is forwarded without processing the "Adspec" does not serve a useful purpose in this case. The reserve messages, however, must be processed at every branch point of a multicast flow. This is achieved using bidirectional flows and a blocking router alert option. Point-to-point connections, however, can exploit the in-band signaling for reservation messages, thus allowing the reservations to be processed in parallel. Other RSVP messages, for errors, tear-down, and confirmation are processed by the RSVP processor in a standard manner, but are transmitted in-band on the established flow. The RSVP processor must in addition process a tear-down commands from the forwarding engine, to invalidate reservation state for flows that have become invalid (at the forwarding level).

Using the support for bidirectional flows, forwarding on the reverse path may be moved out of the RSVP control process, and handled at forwarding level. To allow for softness of the reservation state and to allow for adjustments in reservations in multicast flows as membership (and thus topology) changes, state refresh may still be needed. The stability of the connections, however, can be exploited and therefore the need for frequent state refresh may be reduced. In particular, it is feasible to have the data traffic refresh the state, limiting refresh only to "keep-alives" during extended inactivity. This is particularly true for point-to-point flows. The need for state refresh is further reduced if the route of the flow is pinned. Therefore, removing the connectivity issues from the RSVP processing, and benefiting from the stability caused by connections, RSVP is simplified and may be more optimized for common cases (e.g., point-to-point flows) while retaining the essential qualities of RSVP.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Although various embodiments are specifically illustrated and described herein, it will be appreciated that modifications and variations of the present invention are covered by the above teachings and within the purview of the appended claims without departing from the spirit and intended scope of the invention. For example, although a router was used in certain embodiments of the invention, those skilled in the art will appreciate that the principles described herein can also be applied to other network devices such as ATM switches or LSRs.

What is claimed is:

1. A method for communicating information in a network, comprising:

generating a packet for the information at a first network device;

assigning a flow label to said packet;

assigning a direction to said packet using said flow label, and wherein said flow label is reverse path forwarding enabled; and sending said packet to a second network device through the network.

2. The method of claim 1, wherein said flow label is comprised of a plurality of bits, and wherein said step of assigning said direction comprises the step of setting one of said bits in said flow label.

3. A method for communicating information in a network, comprising:

receiving a first packet at a first input port of an intermediate network device;

identifying a flow label for said first packet;

determining whether a flow table has an entry for said flow label;

creating an entry for said flow label if no entry is present;

obtaining an output port associated with said flow label from said table; and sending said first packet to said output port.

4. The method of claim 3, wherein said step of creating an entry comprises the steps of:

adding an entry for said flow label to said flow table;

determining whether said flow label has an associated routing attribute;

storing a pointer associated with said flow label in said flow table, said pointer pointing to an output port in a routing table for said intermediate network device, if said flow label does not have a routing attribute associated with it; and storing said output port from said routing table in said flow table associated with said flow label, if said flow label does have a routing attribute associated with it.

5. The method of claim 3, further comprising the step of storing said first input port in said flow table associated with said flow label.

6. The method of claim 5, wherein said input and output ports for said intermediate network device are bidirectional, further comprising the steps of:

receiving a second packet at a second input port of said intermediate network device;

identifying a flow label for said second packet;

determining a direction for said second packet using said flow label; and obtaining said first input port associated with said flow label from said flow table; and sending said first packet to said first input port.

7. The method of claim 3, further comprising the steps of:

receiving a second packet at an input port of said intermediate network device;

identifying a flow label for said first packet;

determining whether said first and second packets should be aggregated; and aggregating said first and second packets in accordance with said determination.

8. A method for requesting a connection-oriented packet flow between a first network device and a second network device in a packet network, comprising allocating a flow label to the packet flow that has not been previously declared;

assigning the flow label to a header in a first packet of the packet flow;

adding any desired flow attributes to the header, and sending the packet to the second network device through the network, where in the flow label that has not been previously declared is interpreted by the second network device as a request for a new packet flow and the second network device can utilizes the flow attributes in establishing state for the packet flow, and wherein the flow label includes an indication of direction for the flow.

9. The method of claim 8 wherein the second network device treats the flow label as a request to pin the route between the first network device and the second network device.

10. The method of claim 8 wherein the second network device may send another packet in a reverse path by using a second flow label including a different indication of direction for the flow.

11. The method of claim 10 wherein the flow attributes reflect quality of service attributes for the packet flow.

12. A network router comprising:

a processor;

a plurality of input/output (I/O) interfaces connected to the processor; and one or more storage devices, connected to the processor, further comprising a routing table, a flow table, and a computer program which when executed by the processor performs a method of establishing a packet flow between the network router and a second network router comprising the steps of:

receiving a packet from the second network router with a flow label that has not been previously declare;

interpreting the flow label as a request for a new packet flow between the network router and the second network router; and creating an entry for the flow label in the flow table, and wherein the flow label includes an indication of direction for the flow.

13. The network router of claim 12 wherein the request for a new packet flow is treated by the network router as an implicit request for route pinning between the network router and the second network router.

14. The network router of claim 12 wherein the network router may send another packet in a reverse path to the second network router by using a second flow label including a different indication of direction for the flow.

15. The network router of claim 14 wherein the packet includes quality of service attributes for the packet flow and wherein the network router can establish state based on the quality of service attributes.

* * * * *